US007197009B1

(12) United States Patent
Dispensa (10) Patent No.: US 7,197,009 B1
(45) Date of Patent: Mar. 27, 2007

(54) DELAY VARIATION BASED ROUTING IN COMMUNICATION SYSTEMS

(75) Inventor: Stephen Dispensa, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1014 days.

(21) Appl. No.: 10/092,241

(22) Filed: Mar. 6, 2002

(51) Int. Cl.
*H04L 12/26* (2006.01)

(52) U.S. Cl. ............... 370/237; 370/238; 370/252

(58) Field of Classification Search ........... 370/237
See application file for complete search history.

(56) References Cited

U.S. PATENT DOCUMENTS

| | | | | |
|---|---|---|---|---|
| 5,903,558 A | * | 5/1999 | Jones et al. ............... 370/351 |
| 6,064,654 A | * | 5/2000 | White-Hauser ............ 370/248 |
| 6,236,642 B1 | * | 5/2001 | Shaffer et al. ............. 370/237 |
| 6,449,259 B1 | * | 9/2002 | Allain et al. ............... 370/253 |
| 6,452,922 B1 | * | 9/2002 | Ho ............................ 370/352 |
| 6,574,216 B1 | * | 6/2003 | Farris et al. ............... 370/352 |
| 6,934,258 B1 | * | 8/2005 | Smith et al. ............... 370/238 |

* cited by examiner

*Primary Examiner*—Chau Nguyen
*Assistant Examiner*—Jordan Hamann

(57) ABSTRACT

A communication system determines a delay variation between at least a first link and a second link. The communication system routes user communications over the first link if the delay variation is within a maximum threshold. The communication system routes the user communications over the second link if the delay variation exceeds the maximum threshold.

22 Claims, 7 Drawing Sheets

DELAY VARIATION BASED ROUTING IN COMMUNICATION SYSTEMS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to routing communications over different connections based on the relative delay of the connections.

2. Description of the Prior Art

Figure 1:
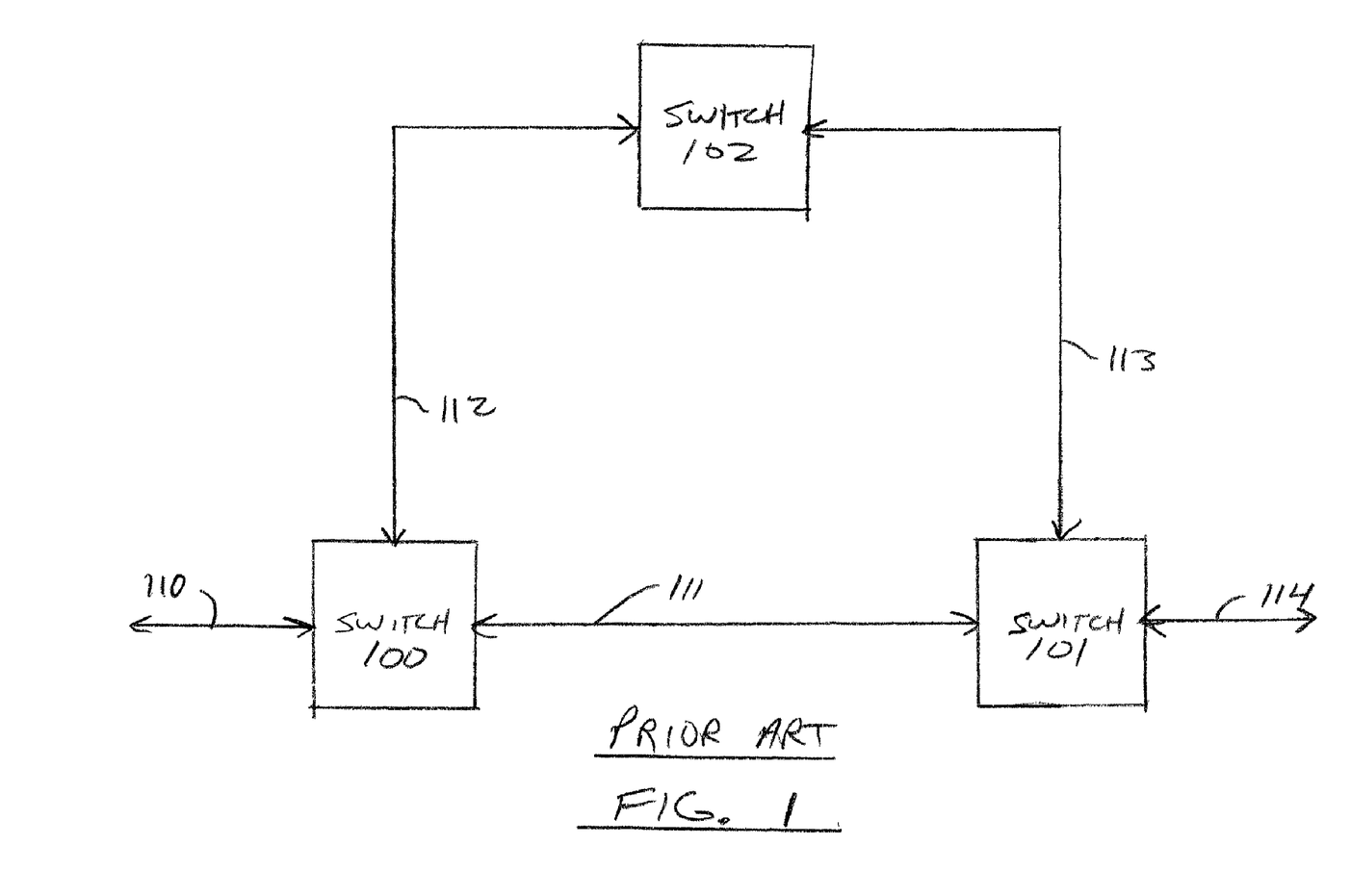
FIG. 1 illustrates a telephone network in the prior art.

FIG. 1 illustrates a telephone network in the prior art. The telephone network includes telephone switches 100–102. Telephone switch 100 is coupled to telephone connections 110–112. Telephone switch 101 is coupled to telephone connections 111 and 113–114. Telephone switch 102 is coupled to telephone connections 112–113. At any given moment, the telephone network handles several calls over telephone connections 110–114.

Consider the routing of telephone calls from telephone switch 100 to telephone switch 101. Telephone switch 100 must decide whether to use telephone connection 111 or telephone connection 112. Telephone connection 111 is directly coupled to telephone switch 101, but telephone connection 112 also requires telephone switch 102 and telephone connection 113 to reach telephone switch 101. Thus, telephone connection 111 is typically more desirable than telephone connection 112.

Telephone switch 100 routes calls to telephone switch 101 over desirable telephone connection 111 until the connection reaches its maximum capacity. When telephone connection 101 reaches its maximum capacity, then telephone switch 100 routes additional calls over less desirable telephone connection 112. As calls terminate, telephone connection 111 falls below its maximum capacity. When telephone connection 101 falls below its maximum capacity, then telephone switch 100 again routes calls over telephone connection 101 until it reaches its maximum capacity. Thus, telephone connections 112–113 provide overflow routing for telephone connection 111.

Figure 2:
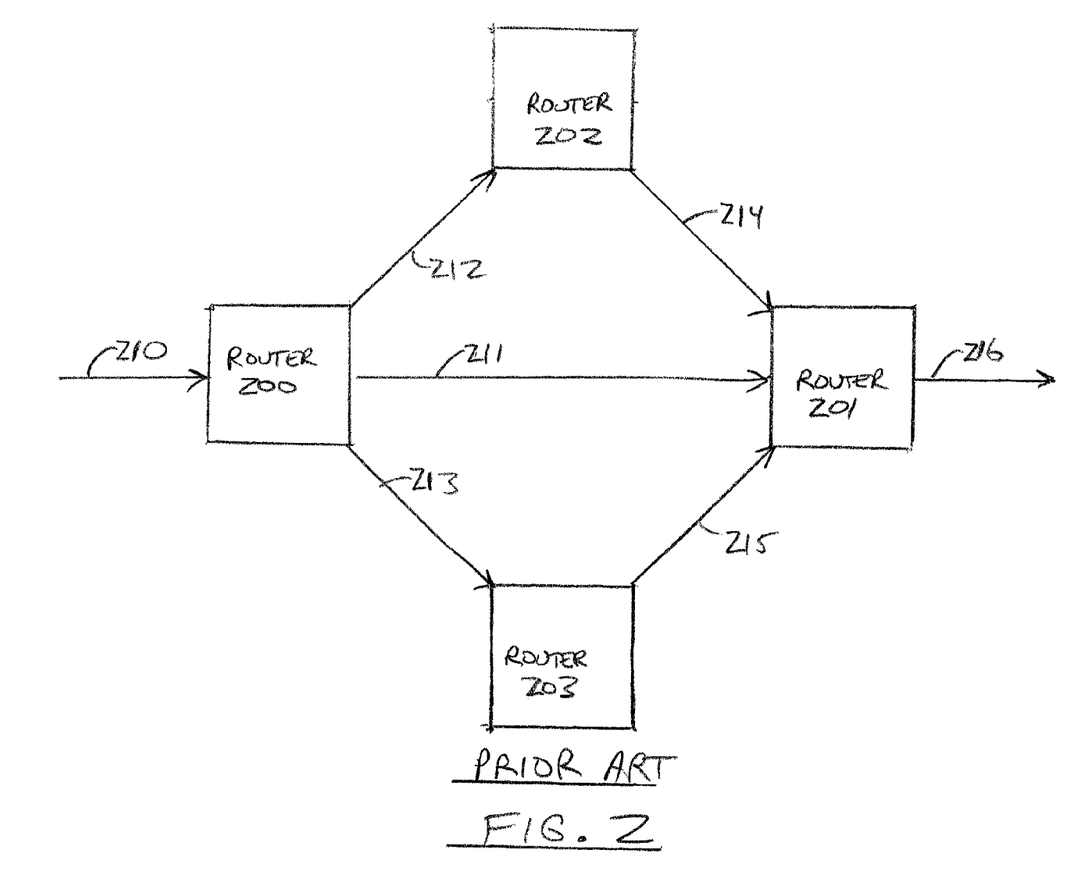
FIG. 2 illustrates an IP network in the prior art.

FIG. 2 illustrates an Internet Protocol (IP) network in the prior art. The IP network includes IP routers 200–203. IP router 200 is coupled to IP connections 210–213. IP router 201 is coupled to IP connections 211 and 214–216. IP router 202 is coupled to IP connections 212 and 214. IP router 203 is coupled to IP connections 213 and 215. At any given moment, the IP network handles several IP packets over connections 210–216.

Consider the routing of IP packets from IP router 200 to IP router 201. IP router 200 must decide whether to use IP connection 211, IP connection 212, or IP connection 213. IP connection 211 is directly coupled to IP router 201. IP connection 212 requires IP router 202 and IP connection 214 to reach IP router 201. IP connection 213 requires IP router 203 and IP connection 215 to reach IP router 201. Thus, IP connection 211 is typically the more desirable connection to use.

IP router 200 routes packets to IP router 201 over desirable IP connection 211. IP connection 211 simply slows down when it becomes heavily loaded, and does not have a maximum capacity that causes IP router 200 to begin using IP connections 212 or 213. IP router 200 may use IP connections 211–213 in some proportional manner, but these proportions are not adaptively changed based on relative capacities. Unfortunately, IP connections 212 and 213 do not provide overflow routing for IP connection 211.

Figure 3:
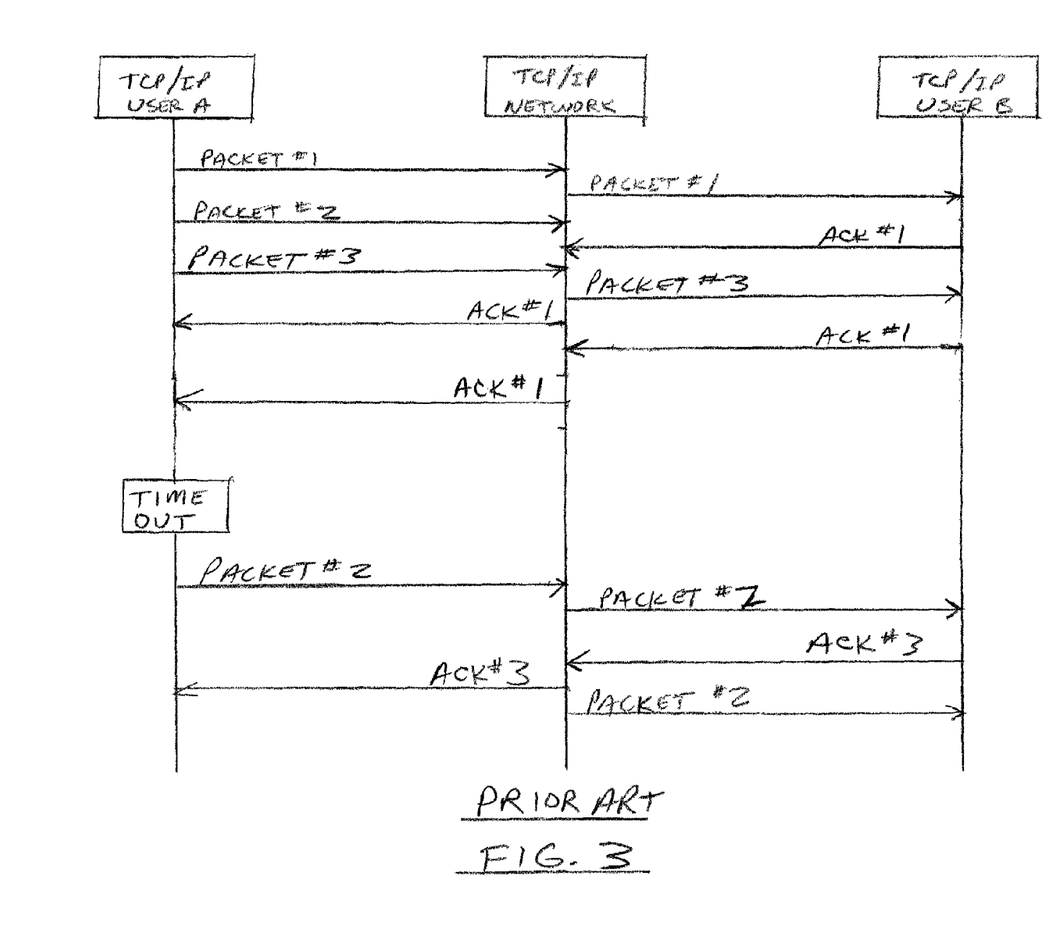
FIG. 3 illustrates a TCP/IP network operation in the prior art.

FIG. 3 illustrates the operation of a Transmission Control Protocol (TCP) based IP network. TCP/IP user A transfers packet #1 to the TCP/IP network for delivery to TCP/IP user B. The TCP/IP network routes packet #1 to TCP/IP user B. TCP/IP user A transfers packet #2 to the TCP/IP network for delivery to TCP/IP user B. Unfortunately, the delivery of packet #2 to TCP/IP user B is delayed.

In response to receiving and checking packet #1, TCP/IP user B transfers acknowledgement (ACK) #1 to the TCP/IP network for delivery to TCP/IP user A. TCP/IP user A transfers packet #3 to the TCP/IP network for delivery to TCP/IP user B. The TCP/IP network routes packet #3 to TCP/IP user B. The TCP/IP network routes ACK #1 to TCP/IP user A.

If packet #2 had been correctly received and checked, TCP/IP user B would have responded to TCP/IP user A with ACK #2. However in this example, packet #2 was delayed. In response to receiving and checking packet #3 without yet receiving packet #2, TCP/IP user B again transfers ACK #1 to the TCP/IP network for delivery to TCP/IP user A. Note that TCP/IP user B cannot transfer ACK #3 until all packets #1, #2 and #3 are correctly received and checked. The TCP/IP network routes the second ACK #1 to TCP/IP user A.

TCP/IP user A sets a timer when it transmits a packet and will re-transmit the packet if the corresponding ACK is not received before the timer times-out. In this example, ACK #1 for packet #1 is received by TCP/IP user A before the time-out, so no re-transmission for packet #1 is required. Since packet #2 is delayed, no ACK #2 has been sent and the timer in TCP/IP user A for packet #2 times out. In response to the time-out, TCP/IP user A re-transmits packet #2 to the TCP/IP network for delivery to TCP/IP user B. This time, the TCP/IP network routes packet #2 to TCP/IP user B without delay. In response to receiving and checking packet #2 and now having correct packets #1, #2, and #3, TCP/IP user B transfers ACK #3 to the TCP/IP network for delivery to TCP/IP user A. The TCP/IP network routes ACK #3 to TCP/IP user A. Subsequently, the original but delayed packet #2 finally arrives at TCP/IP user B and is thrown away.

Note that the delay in transferring the original packet #2 caused a packet mis-sequence at TCP/IP user B, and the mis-sequence caused a re-transmission of packet #2. The re-transmission wastes both user and network resources, so it is desirable to avoid TCP/IP transmission techniques that cause mis-sequencing. For this reason, IP routers typically route all packets going to the same destination over the same IP connection, so the packets generally experience the same delay and remain in sequence. Unfortunately, this technique can overload the IP connection and slow down packet transfer to unacceptable levels.

SUMMARY OF THE INVENTION

The invention solves the above problems by controlling the flow of user communications over two links to maintain an acceptable delay variation over the links. This flow control reduces the problem of mis-sequenced packets when the links communicate with a common destination. Advantageously, the use of favored links can be optimized without creating undo sequencing problems.

Some examples of the invention include software products comprising a storage medium configured with flow control software. The flow control software is configured to direct a processing system to determine a delay variation between at least a first link and a second link. The flow control software is configured to direct a processing system to control a communication system to route user communications over the first link if the delay variation is within a maximum threshold. The flow control software is configured to direct a processing system to control the communication system to route the user communications over the second link if the delay variation exceeds the maximum threshold. The flow control software may be configured to direct the processing system to adjust the maximum threshold in response to packet sequence problems. The flow control software may be configured to direct the processing system to adjust the maximum threshold in response to repeat TCP ACKs. The flow control software may be configured to direct the processing system to route the user communications over a pre-determined one of the links if the user communications comprise voice traffic.

Some examples of the invention include methods of operating a communication system. The methods include: 1) determining a delay variation between at least a first link and a second link, 2) routing user communications over the first link if the delay variation is within a maximum threshold, and 3) routing the user communications over the second link if the delay variation exceeds the maximum threshold. The methods may include adjusting the maximum threshold in response to packet sequence problems. The methods may include adjusting the maximum threshold in response to repeat TCP ACKs. The methods may include routing the user communications over a pre-determined one of the links if the user communications comprise voice traffic.

Some examples of the invention include communication systems that comprise a communication processing system and a flow control system. The communication processing system is configured to route user communications over a first link or a second link in response to control signals. The flow control system is configured to determine a delay variation between at least a first link and a second link, generate the control signals to route user communications over the first link if the delay variation is within a maximum threshold, and generate the control signals to route the user communications over the second link if the delay variation exceeds the maximum threshold. The flow control system may be configured to adjust the maximum threshold in response to packet sequence problems. The flow control system may be configured to adjust the maximum threshold in response to repeat TCP ACKs. The flow control system may be configured to generate the control signals to route the user communications over a pre-determined one of the links if the user communications comprise voice traffic. The links may comprise, a wireless link, MMDS link, DSL link, ISDN link, or T1 link.

BRIEF DESCRIPTION OF THE DRAWINGS

The same reference number represents the same element on all drawings.

DETAILED DESCRIPTION OF THE PREFERRED EMBODIMENT

Figure 4:
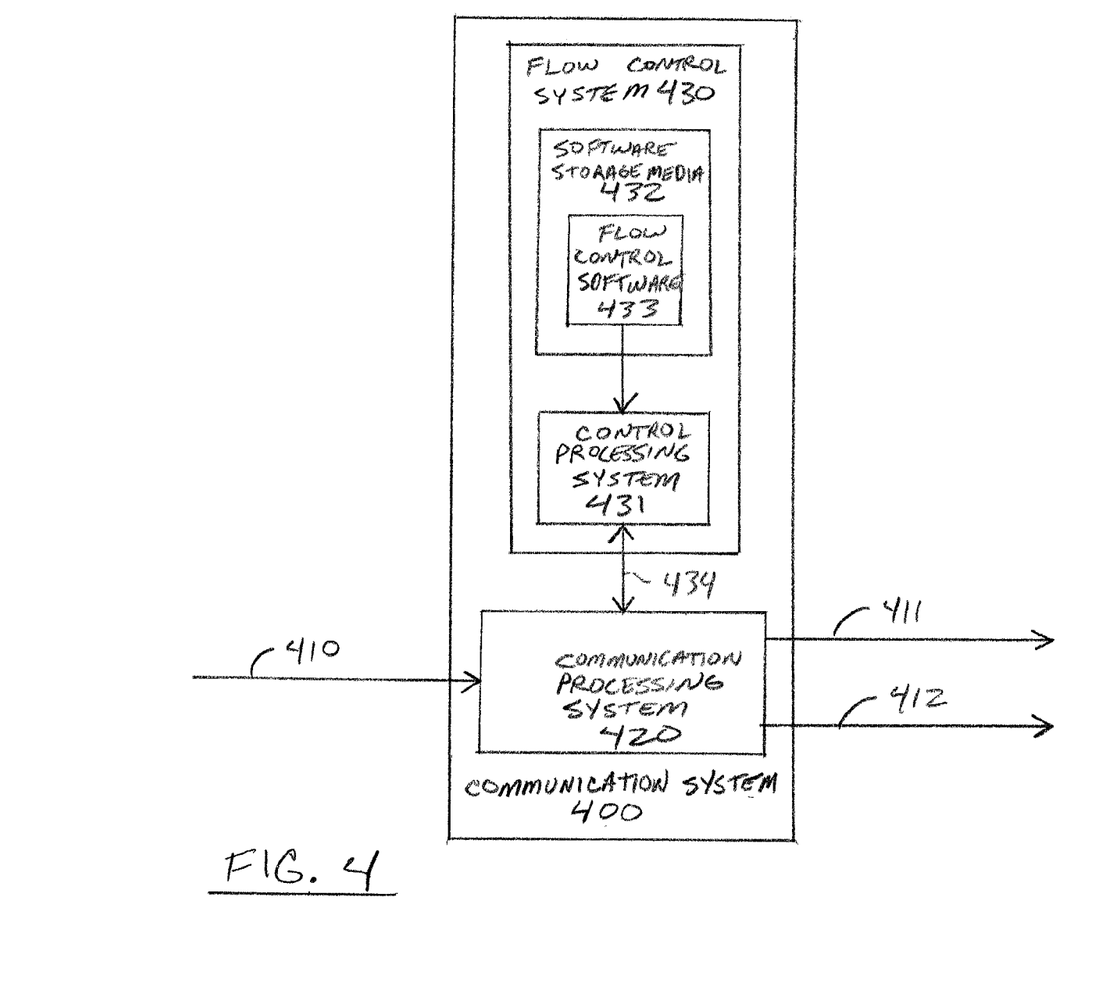
FIG. 4 illustrates a communication system in an example of the invention.

FIG. 4 illustrates communication system 400 in an example of the invention. Communication system 400 includes communication processing system 420 and flow control system 430. Flow control system 430 includes control processing system 431 and software storage media 432. Software storage media 432 includes flow control software 433.

Communication processing system 420 is coupled to incoming link 410 and to outgoing links 411–412. Links 410–412 may include optical, wireless, metallic, or other types of transport media. Links 410–412 may utilize time division multiplex, asynchronous transfer mode, internet protocol, transmission control protocol, synchronous optical network, code division multiple access, microwave multi-point distribution system, or other protocols. The links may be unidirectional or bi-directional.

Communication processing system 420 receives user communications from link 410 and transfers the user communications over either link 411 or 412 in response to control signals 434 from control processing system 420. Communication processing system 420 could be a switch, router, multiplexer, computer, or some other communication device.

Control processing system 431 is a computer, circuitry, or some other device that can execute flow control software 433 to generate control signals 434 for communication processing system 420. Control signals 434 indicate whether communication processing system 420 should transfer user communications from link 410 to either link 411 or link 412. Software storage media 432 could be a tape, disk, integrated circuit, server, or some other memory device.

Based on this disclosure, those skilled in the art will readily appreciate how to configure conventional communications and computing components to make communication system 400. Those skilled in the art will appreciate that software 433 could be firmware, encoded circuitry, or some other device for providing operating instructions to processing system 431. Although numerous examples are given above, communication system 400 could be comprised of a conventional personal computer configured with an operating system, flow control software 433, and Ethernet interfaces for links 410–412.

Consider the situation where a sequence of packets are received from link 410 and will be transferred over links 411 and 412 to a common destination. If the delay on link 411 is the same as the delay of link 412, then the packets on link 411 will arrive on time and in sequence with the packets on link 412. If the delay on link 411 is much greater than the delay of link 412, then the packets on link 411 will arrive late and out of sequence with the packets on link 412. As discussed above for FIG. 3, packet mis-sequencing causes problems. Empirical studies may be taken to determine a threshold amount of delay variation between links 411 and 412 before mis-sequencing becomes unacceptable. The delay variation is the difference between the delay of link 411 and the delay of link 412. Delay can be measured in bits per second.

When executed by control processing system 431, flow control software 433 directs control processing system 431 to determine the delay variation between links 411 and 412. Flow control software 433 then directs control processing system 431 to generate control signals 434 for communication processing system 420. Control signals 434 are configured to control the routing of user communications over links 411 and 412 to maintain the delay variation below the threshold. This may be accomplished by offloading traffic from the slower link to the faster link until the delay variation falls below the threshold. Thus, flow control software 433 ensures that mis-sequencing problems remain at an acceptable level while allowing communications to a common destination to be sent over different links.

Figure 5:
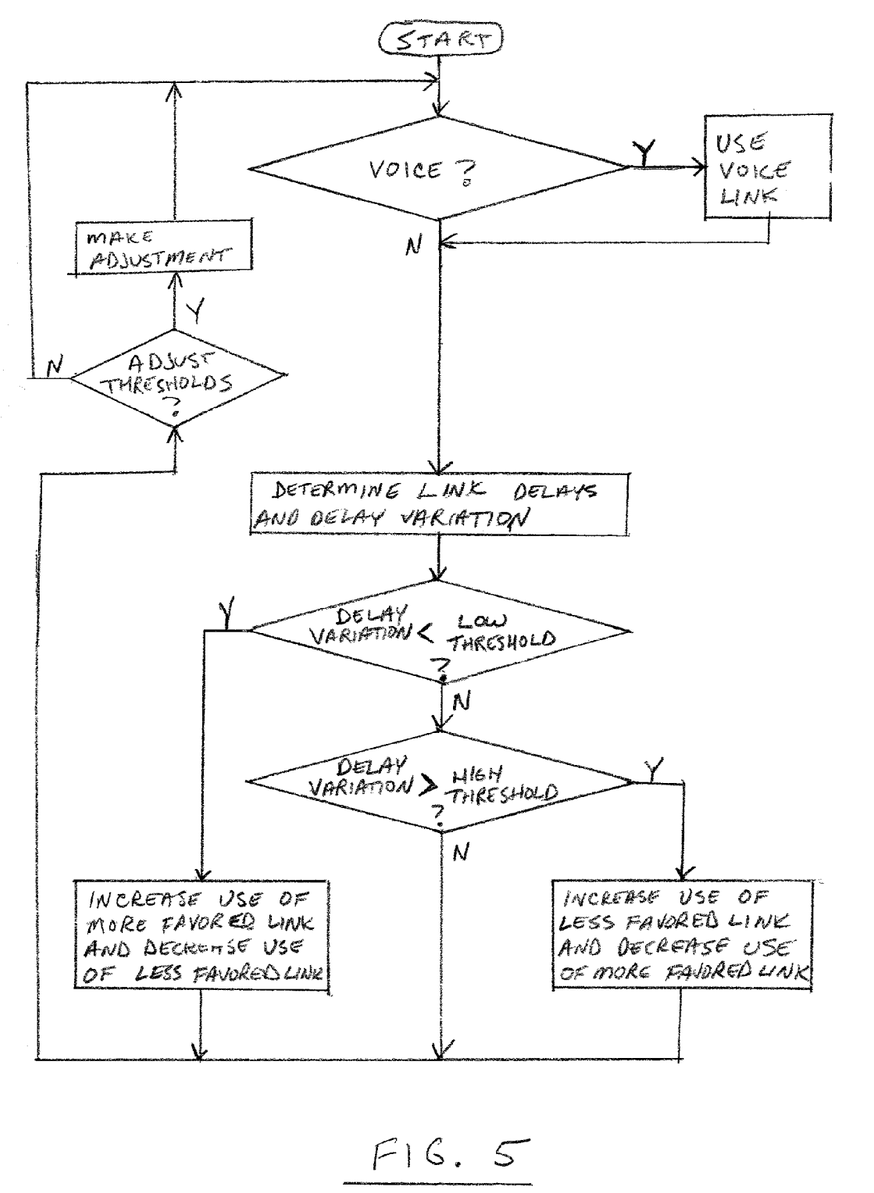
FIG. 5 illustrates communication system operation in an example of the invention.

FIG. 5 illustrates communication system operation in an example of the invention. In this example, the system exerts flow control between a more favored link and a less favored link. The more favored link might be a low-cost high-capacity link, and the less favored link might be an expensive usage-based link. One of the links is designated for voice communications.

As user communications arrive, the system determines if they are voice communications, and if so, the system transfers the user voice communications over a designated voice link. The communication system then determines the delay for each link. The difference between the two delays is the delay variation. If the delay variation is less than a low threshold, then the system increases the use of the more favored link and decreases use of the less favored link. If the delay variation is more than a high threshold, then the system increases the use of the less favored link and decreases use of the more favored link.

The system determines if the thresholds need adjusted and makes any necessary adjustments. One technique for adaptively adjusting thresholds is to monitor TCP ACKs. When mis-sequencing occurs, the TCP receiver transmits repeat ACKs. For example in FIG. 3, ACK #1 is repeated for packet #3 when packet #2 is delayed. Thus, if the system detects an unacceptable number of repeat TCP ACKs, then the maximum threshold could be lowered. In a similar manner, few repeat TCP ACKs might indicate that the maximum or minimum threshold could be raised.

Figure 6:
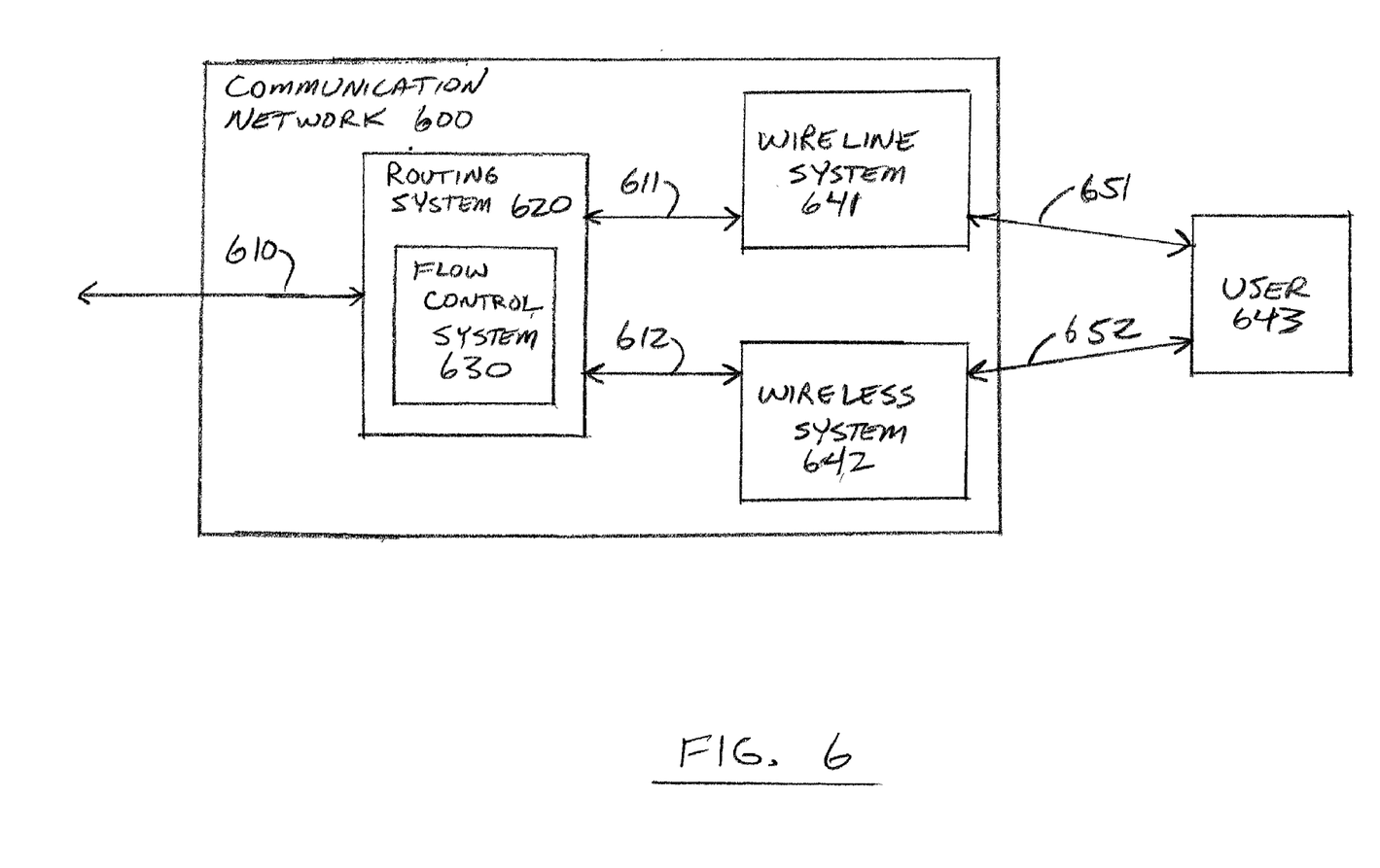
FIG. 6 illustrates a wireless and wireline communication system in an example of the invention.

FIG. 6 illustrates wireless and wireline communication network 600 in an example of the invention. Communication network 600 includes routing system 620, wireline system 641, and wireless system 642. Routing system 620 includes flow control system 630. Routing system 620 is coupled to links 610–612. Wireline system 641 is coupled to link 611. Wireless system 642 is coupled to link 611. Links 610–612 could be conventional. Wireline system 641 communicates with user 643 over wireline link 651. One example of wireline link 651 is a T1, but other wireline links could be used. Wireless system 642 communicates with user 643 over wireless link 652. One example of wireless link 652 is an MMDS link, but other wireless links could be used.

Routing system 620 routes communications between link 610 and links 611–612 under the control of flow control system 630. Flow control system 630 determines whether to use link 611 or link 612 for communications to or from link 610. Routing system 620 could be configured and operate like communication system 400 of FIG. 4.

For example, it may be desirable to favor the use of wireline link 651 to conserve the shared bandwidth of wireless link 642. Wireline link 651 would also be preferred for voice traffic. It is also desirable to maintain an acceptable delay variation between links 651–652 to avoid mis-sequencing problems. Thus, by applying the operation of FIG. 5 through flow control system 630, the use of the favored link 651 is optimized without undo sequencing problems.

Figure 7:
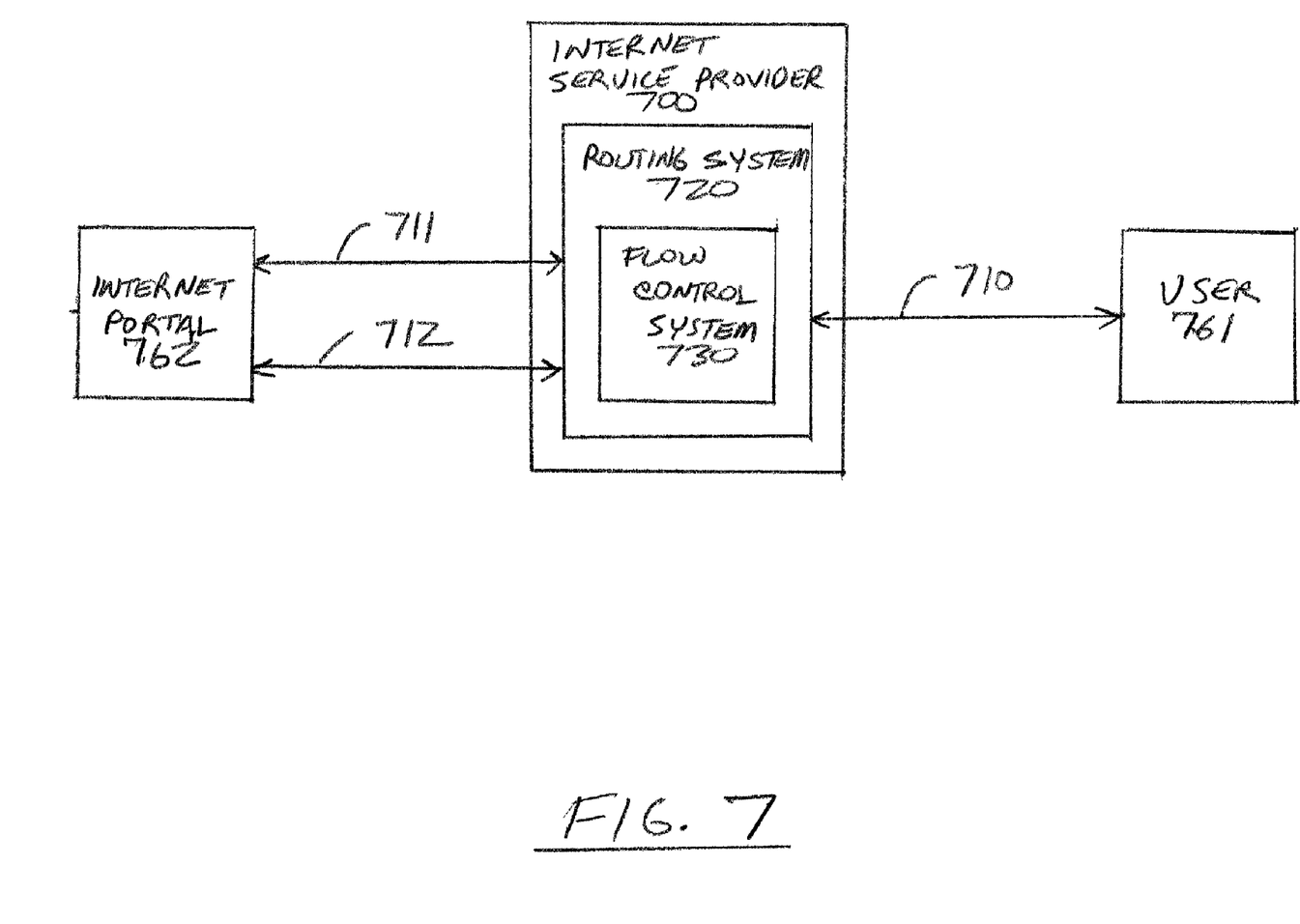
FIG. 7 illustrates an Internet service provider in an example of the invention.

FIG. 7 illustrates Internet service provider 700 in an example of the invention. Internet service provider 700 includes routing system 720. Routing system 720 includes flow control system 730. Routing system 720 is coupled to links 710–712. Routing system 720 communicates with user 761 over link 710. One example of link 710 is a modem connection over a telephone line, but other links could be used. Routing system 720 communicates with Internet portal 762 over links 711–712. One example of link 711 is a DSL connection, and one example of link 712 is an ISDN connection, but other links could be used.

Routing system 720 routes communications between link 710 and links 711–712 under the control of flow control system 730. Flow control system 730 determines whether to use link 711 or link 712 for communications to or from link 710. Routing system 720 could be configured and operate like communication system 400 of FIG. 4.

For example, it may be desirable to favor the use of DSL link 711 to save the money that is required for the expensive usage-based of ISDN link 712. It is also desirable to maintain an acceptable delay variation between links 711–712 to avoid mis-sequencing problems. Thus, by applying the operation of FIG. 5 through flow control system 730, the use of the favored link 711 is optimized without undo sequencing problems.

FIGS. 4–7 and the above description depict specific examples of systems in accord with the present invention. Those skilled in the art will appreciate that some conventional aspects of these systems have been simplified or omitted for clarity. Those skilled in the art will appreciate that the features described above could be combined in various ways to form multiple variations of the invention. Those skilled in the art will also appreciate variations of the systems that fall within the scope of the invention. As a result, the invention is not limited to the specific examples described above, but only by the following claims and their equivalents.

I claim:

1. A software product comprising:
   a computer readable storage medium having flow control software stored thereon;
   the flow control software, when executed by a processing system, directs the processing system to determine a delay variation between at least a first link and a second link, control a communication system to route user communications over the first link if the delay variation is within a maximum threshold, control the communication system to route the user communications over the second link if the delay variation exceeds the maximum threshold, and adjust the maximum threshold in response to the delay variation.

2. The software product of claim 1 wherein the flow control software is configured to, when executed by the processing system, direct the processing system to adjust the maximum threshold in response to packet sequence problems.

3. The software product of claim 1 wherein the flow control software is configured to, when executed by the processing system, direct the processing system to adjust the maximum threshold in response to repeat TCP ACKs.

4. The software product of claim 1 wherein the flow control software is configured to, when executed by the processing system, direct the processing system to route the user communications over a pre-determined one of the links if the user communications comprise voice traffic.

5. A method of operating a communication system comprising:
   determining a delay variation between at least a first link and a second link;
   routing user communications over the first link if the delay variation is within a maximum threshold;
   routing the user communications over the second link if the delay variation exceeds the maximum threshold; and
   adjusting the maximum threshold in response to the delay variation.

6. The method of claim 5 further comprising adjusting the maximum threshold in response to packet sequence problems.

7. The method of claim 5 further comprising adjusting the maximum threshold in response to repeat TCP ACKs.

8. The method of claim 5 further comprising routing the user communications over a pre-determined one of the links if the user communications comprise voice traffic.

9. The method of claim 5 wherein one of the links comprises a wireless link.

10. The method of claim 5 wherein one of the links comprises an MMDS link.

11. The method of claim 5 wherein one of the links comprises a DSL link.

12. The method of claim 5 wherein one of the links comprises a ISDN link.

13. The method of claim 5 wherein one of the links comprises a T1 link.

14. A communication system comprising:
   a communication processing system to route user communications over a first link or a second link in response to control signals; and
   a flow control system to determine a delay variation between at least a first link and a second link, generate the control signals to route user communications over the first link if the delay variation is within a maximum threshold, generate the control signals to route the user communications over the second link if the delay variation exceeds the maximum threshold, and adjust the maximum threshold in response to the delay variation.

15. The communication system of claim 14 wherein the flow control system is configured to adjust the maximum threshold in response to packet sequence problems.

16. The communication system of claim 14 wherein the flow control system is configured to adjust the maximum threshold in response to repeat TCP ACKs.

17. The communication system of claim 14 wherein the flow control system is configured to generate the control signals to route the user communications over a pre-determined one of the links if the user communications comprise voice traffic.

18. The communication system of claim 14 wherein one of the links comprises a wireless link.

19. The method of claim 14 wherein one of the links comprises an MMDS link.

20. The communication system of claim 14 wherein one of the links comprises a DSL link.

21. The communication system of claim 14 wherein one of the links comprises a ISDN link.

22. The communication system of claim 14 wherein one of the links comprises a T1 link.

* * * * *